United States Patent

Hagdahl

[15] 3,655,060
[45] Apr. 11, 1972

[54] GAS OR LIQUID FILTER

[72] Inventor: Erik Lennart Hagdahl, Bergsatra, Sweden

[73] Assignee: Stora Kopparbergs Bergslags Aktiebolag, Falun, Sweden

[22] Filed: Mar. 3, 1970

[21] Appl. No.: 16,126

[30] Foreign Application Priority Data

Mar. 5, 1969    Sweden..................................3050/69

[52] U.S. Cl...............................210/493, 55/500, 55/509, 55/521
[51] Int. Cl.......................................................B01d 29/06
[58] Field of Search..................210/227, 228, 230, 231, 483, 210/484, 487, 493; 55/500, 521, 497, 499, 509

[56] References Cited

UNITED STATES PATENTS

| 930,561 | 8/1909 | Rahe | 55/500 X |
| 2,681,155 | 6/1954 | Graham | 210/493 |
| 3,410,062 | 11/1968 | Hart | 55/521 |

FOREIGN PATENTS OR APPLICATIONS

| 1,022,232 | 3/1966 | Great Britain | 55/521 |

*Primary Examiner*—Reuben Friedman
*Assistant Examiner*—T. A. Granger
*Attorney*—Stevens, Davis, Miller & Mosher

[57] ABSTRACT

A gas or liquid filter structure comprising a fibrous filter web arranged in alternating folds and in which there is positioned between adjacent folds a grid-like distance member which presents a portion adapted to conform to the contours of each fold edge and support it from within.

7 Claims, 7 Drawing Figures

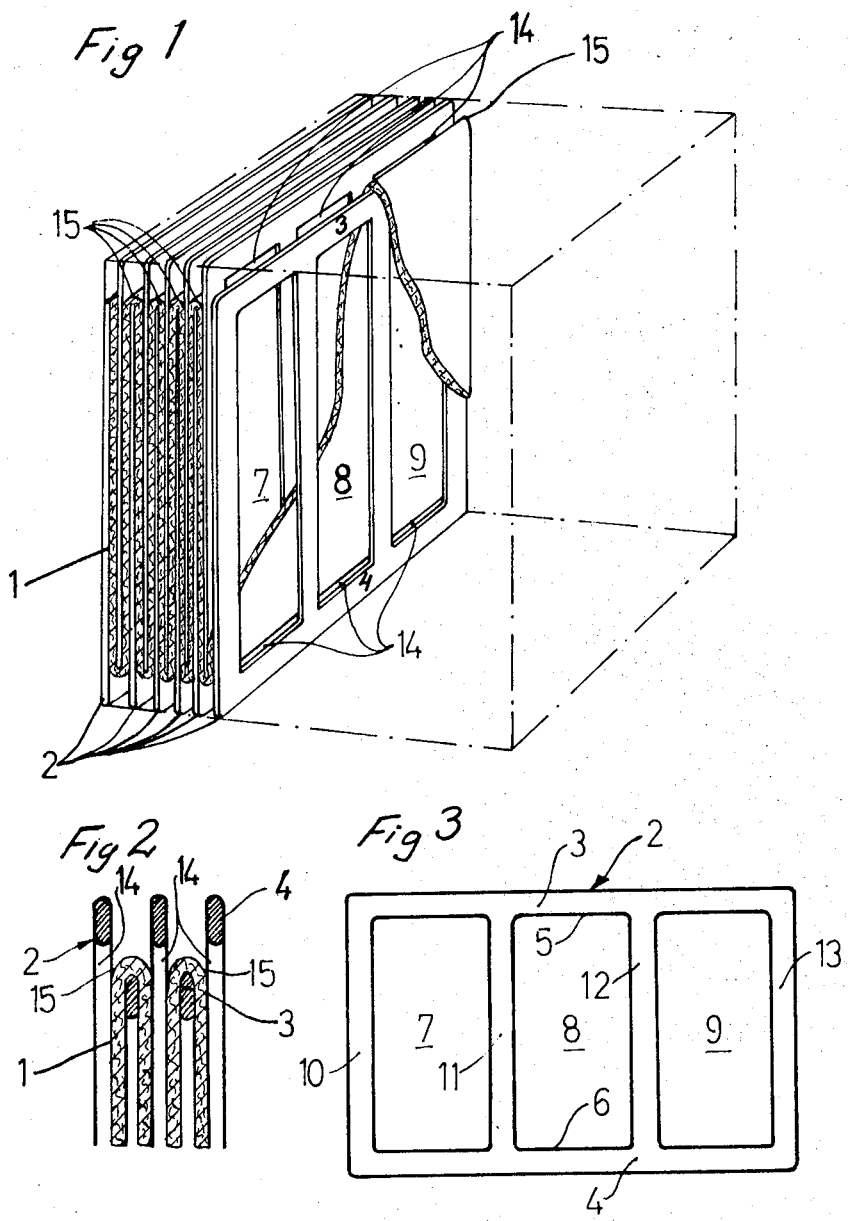

GAS OR LIQUID FILTER

The present invention relates to a filter or gas and liquid media, including a filter means in the form of a web of fibrous material which has been folded transversely of its longitudinal extension, to form a plurality of substantially equally sized filter surfaces which extend generally parallel to each other and which are defined by parallel fold edges alternating towards the inlet and outlet side of the filter and which are held apart by distance means mounted between adjacent filter surfaces.

As a result of their large total filter area, filters of this type can be given a very high capacity and, among other things, are suitable for filtering gases, for example air, particularly when it is necessary to obtain large quantities of filtered gas in a short period of time and when it is desirable to obtain the least possible pressure drop across the filter. Such filters are used, for example, when producing sterile or particle-free air for so-called clean rooms, which are used within the pharmaceutical industry and in the precision-tool industry and other fields where it is necessary to work in a particle-free atmosphere. The filtering agent primarily used in such filter means is glass fibre paper, which, despite imparting to the gas or liquid flowing therethrough a very high degree of purity, gives rise to but a relatively small drop in pressure.

The previous manufacture of filters of the type described often incorporate the use of thin, corrugated aluminium plates as distance pieces, the corrugation folds being arranged to extend in the longitudinal direction of the fibre material web, i.e. substantially at right angles to the fold edges, so that the medium being filtered obtains through the corrugating folds free passage towards and away from respective filter surfaces. The corrugated aluminium plates, however, often cause damage to the fibre material web and, furthermore, offer but slight support to the fold edges. It has also been suggested to use distance means made of corrugated cardboard. These distance means, however, gave but a small degree of rigidity to the filter and, similar to the corrugated aluminium plates, offer but small support to the fold edges. The object of the present invention is to provide a novel and convenient filter of the type described, in which the fibre material web and its fold edges are gently but effectively supported and protected against external damage.

For the purpose of achieving this object, it is suggested in accordance with the invention that the distance means each include two edge pieces extending transversely of the longitudinal direction of the fibre material web and situated at the inlet and outlet side of the filter, and stiffening means which join the opposing inner edges of the edge pieces and which hold their adjacent filter surfaces in spaced relationship in a manner to form between the inner edges of the edge pieces passages which are open towards the adjacent filter surfaces, wherewith one edge piece supports from within with its outer edge the fold edge common the filter surfaces held apart by the distance means, while the other edge piece is so situated and constructed that, between the inner edge thereof and the two fold edges situated adjacent said edge piece and defining the two filter surfaces held apart by the distance means, there is formed a slot which permits the medium being filtered to flow towards and away from the passages, and in that the outer edge surface of said other edge piece is situated outside the two last-mentioned fold edges to protect said edges against external damage.

The invention will now be described in detail with reference to a number of embodiments illustrated in the accompanying drawings.

FIG. 1 is a perspective view of a first embodiment of a filter according to the invention.

FIG. 2 shows in larger scale a partial cross sectional view of the filter according to FIG. 1.

FIG. 3 shows in side projection one of the distance pieces used in the filter illustrated in FIG. 1 and 2.

Figures 4, 5:
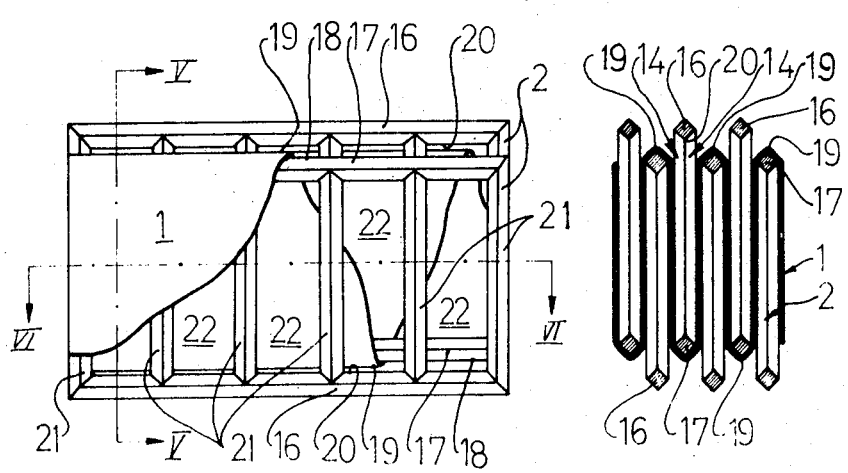
FIG. 4 shows in vertical projection a second embodiment of the filter of the invention.
FIG. 5 shows a section taken through the line V—V in FIG. 4.

As is seen from FIGS. 1–7, where corresponding parts are identified with the same reference numerals, the filter of the present invention comprises a filter means in the form of a fibre material web 1 which is folded transversely of its longitudinal extension, to form a plurality of substantially equal size filter surfaces which extend generally parallel with each other and which are defined by parallel fold edges arranged to alternate towards the inlet and outlet side of the filter, and which filter surfaces are held apart by distance pieces 2 mounted between adjacent filter surfaces.

Only a portion of the fibre material web 1 and a few of the distance pieces embodied therein have shown in FIG. 1. The full extension of the filter is shown by the morse lines. As will be seen from FIGS. 1–3, each distance piece 2 comprises two edge pieces 3, 4 situated at the inlet and outlet side of the filter and extending transversely of the longitudinal extension of the fiber material web 1, and stiffening means 10, 11, 12 and 13 which join the opposing inner edges 5 and 6 of the edge pieces and hold apart the filter surfaces engaging said stiffening means in a manner whereby passages 7, 8 and 9 which open towards the adjacent filter surfaces are formed between the inner edges 5, 6 of the edge pieces. One edge piece 3 of each distance means 2 supports from within the fold edge 15 common the two filter surfaces held apart by the distance piece, while the other edge piece 4 is so situated and constructed that between its inner edge 6 and two fold edges situated adjacent the edge piece 4 are provided slots 14 for permitting the medium being filtered to flow towards and away from the passages 7, 8 and 9. The outer edge surface of each edge piece 4 is situated outside the fold edges 15 adjacent this edge piece, so that a grid structure which protects the fold edges 15 against external damage is formed on both the inlet side and the outlet side of the filter, as is clearly evident from FIGS. 1 and 2.

With the filter illustrated in FIGS. 1–3, the distance pieces 2 present flat surfaces for abutment with adjacent filter surfaces. The distance pieces 2 have the form of open grid structures and can have been produced by punching the areas forming the passages 7, 8, 9 from flat plate. The thus integrally formed distance pieces may suitably comprise a non-corrosive material, for example a semi-hard or hard plastic material, and may, in at least certain areas, be secured by an adhesive to adjacent filter surfaces, to increase the strength of the filter and optionally render the same self-supporting to such an extent that it can be used without embodying an external strengthening frame surrounding the filter, or other support means.

The inner edges 6 of the edge pieces 4 are so constructed, for example rounded or chamfered, that they provide and form guides for a substantially laminar noiseless flow of the medium being filtered, out of and into the filter.

As will be seen from FIG. 1, each stiffening rib 10, 11, 12 or 13 of the distance piece 2 may be situated opposite a stiffening rib of each of the remaining distance pieces 2, whereby a pillar-like structure is formed transversely of the through-flow direction of the filter, which imparts a high degree of strength to the filter. Furthermore, as is shown in FIG. 1, each distance piece may present two stiffening ribs 10 and 13 extending along and opposite their respective one of the long edges of the folded fibre material web 1, whereby the long edges of the fibre web are effectively protected and two stable filter sides are formed, at which means can be mounted for securing the filter in a filter box.

The simplest manner of producing the slots 14 in the embodiment illustrated in FIGS. 1–3 is to arrange that the distance between the outer edge of the edge piece 3 and the inner edge 6 of the edge piece 4 at each distance piece 2 slightly exceeds the extension of each filter surface 17 the longitudinal direction of the fibre material web 1.

When producing the filter illustrated in FIGS. 1-3, a distance piece 2 is placed over an unfolded fibre material web 1 with the edge pieces 3 and 4 of the distance piece arranged transversely of the longitudinal direction of the web, whereafter the web 1 is folded over the distance piece 2 parallel with itself. Another distance piece 2 is then placed over the fibre web and the preceding distance piece, although slightly offset in relation thereto, so to form a slot 14 between the fold edge 15 formed when the web 1 is folded over the inner edge piece 3 of the latter distance piece and the inner edge 6 of the edge piece 4 of the first distance piece.

The distance pieces 2 are then subsequently placed in position, alternately offset to the same extent as the two distance pieces first mounted, and in this way slots 14 are obtained between the fold edges 15 and the outer edge pieces 4 of the distance pieces 2. The surfaces with which the distance pieces 2 abut the fibre material web are suitably coated with an adhesive, before the distance pieces are placed on the web 1 and the web folded over the edge pieces 3.

It is also possible, however, to use a fibre material web 1 which has been prefolded to the illustrated shape, and to introduce distance pieces 2 in the folds alternately from different directions.

Figures 6, 7:
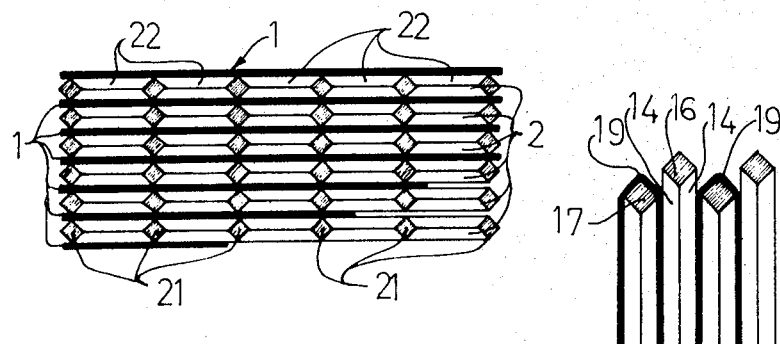
FIG. 6 shows a section taken through line VI—VI in FIG. 4.
FIG. 7 shows in larger scale a partial section of a modification of the filter of FIGS. 4–6, similar to FIG. 5.

FIGS. 4-6 illustrate a filter constructed in accordance with the invention and in which practically the whole of the surface of the fibre material web is used for filtering purposes. This filter is, in its entirety, less durable than the filter of the embodiment illustrated in FIGS. 1-3, but the advantages gained with the widely increased active filter surface are often so great that they outway its disadvantages, which may include the necessity of stiffening the filter with a suitable external frame before it can be placed in operation. The filter illustrated in FIGS. 4-6 is particularly suitable when the lowest possible noise effect is desired at the filter and when, owing to shortage of space, for example, it is not possible to increase the number of filter folds. The noise level of a filter is, to a large extent, a result of its resistance to through-flow, and the easiest way of reducing this resistance is to increase the active filtering surface of the filter. In the case of a filter with which it is desired to maintain a low noise level, it is generally necessary, furthermore, to be satisfied with a relatively low through-flow speed, since this factor also plays a large role in the noise level of the filter, and hence a wide filter surface is required.

In the exemplary embodiment of the filter of FIGS. 4-6, each distance piece 2 comprises two parallel edge pieces 16 and 17, which extend transversely of the longitudinal direction of the fibre material web 1 and are joined by means of stiffening ribs 21 extending between said edge pieces. The distance between the outer edge surfaces of the edge pieces 16, 17 exceeds the length of each filter surface in the longitudinal direction of the filter material web 1, and hence the outer edge surface of the outer edge piece 16 of each distance piece 2 at the inlet and outlet side of the filter is located outside a plane passing through the fold edges 19 on the inlet and outlet side and protects the fold edges 19 against external damage, while the opposite, inner edge piece 17 of each distance piece 2 supports with its outer edge surface 18 from within the common fold edge 19 for the filter surfaces held apart by the distance piece in question. Arranged between the inner edge surface 20 of each outer edge piece 16 and the fold edges 19 situated adjacent this edge piece are slots 14, which permit the medium being filtered to pass into and out of a number of passages 22, which are open towards the adjacent filter surfaces and positioned adjacent the stiffening ribs 21.

The stiffening ribs 21 abut the filter surfaces along only narrow edge surfaces, said stiffening ribs obtaining their necessary inherent rigidity by having a certain extension parallel with the filter surfaces at a distance therefrom. Thus, the stiffening ribs 21 present a rectangular cross section, so oriented that one diagonal thereof is essentially perpendicular to the filter surfaces and the other diagonal substantially parallel with said surfaces. The stiffening ribs 21 thus present a corner edge to each of the filter surfaces, whereupon a substantially line abutment is obtained. The edge pieces 16 and 17 have been given the same rectangular cross section, and in this way an advantageous support to the fold edges 19 of the filter fold is obtained at the same time as the outer edge pieces 16 obtain an aerodynamically, or hydrodynamically advantageous shape for guiding the medium undergoing filtration into and out of the filter.

As will be seen from FIG. 7, the slots 14 between the outer edge pieces 16 and the filter folds 19 situated adjacent said edge pieces can be obtained even though the outer edge pieces are not placed in their entirety outside a plane which passes through the filter folds 19 of the inlet side and the outlet side of the filter.

It naturally lies within the scope of the invention to use, with regard to the edge pieces and stiffening ribs of the distance pieces, cross sectional shapes, other than those shown. Thus, another suitable cross sectional profile of the stiffening ribs of the distance pieces and also of the edge pieces in the embodiment illustrated in FIGS. 4-7 is a triangular one, and it should be understood that many other profiles are also suitable in the present connection. The different components of the distance pieces may also be given mutually different cross sectional profiles and subsequently different forms of abutment with the filter surfaces. In connection herewith, for the purpose of stiffening the filter the stiffening ribs may be given shapes of such mutually varying form that abutment edges for a line abutment effect are alternated with wider abutment surfaces. When desiring to obtain a line abutment effect, it must be ensured that the filter surfaces are not damaged by the narrow abutment edges. A suitable selection of the material for the distance pieces is then very important, and among those materials suitable can be mentioned semi-hard plastics. The arrangement of the invention is not restricted to the modifications illustrated in the drawing, but can be varied within the scope of the following claims.

What is claimed is:

1. A filter for gaseous and liquid media, comprising in combination a filter means in the form of a web of fibrous material folded transversely of its length to form a plurality of substantially equal sized filter surfaces, which extend generally parallel to one another and which are defined by parallel folds alternating towards the inlet and the outlet side of the filter and are held apart by filter surface spacing means, wherein each of the spacing means has the form of an open grid-like structure, comprising two edge pieces extending transversely of the longitudinal direction of the web of fibrous material and located at the inlet and the outlet side of the filter, and stiffening ribs, which join the edge pieces together at their respective opposing inner edge surfaces said edge pieces and said stiffening ribs being substantially coplanar, and which stiffening ribs are positioned along said edge pieces in a manner such that each stiffening rib of one spacing means is located opposite a corresponding stiffening rib of the remaining spacing means in the filter, whereby said stiffening ribs, together with intermediate filter material, form reinforcing columns, which extend along the whole filter, and wherein one edge piece of each spacing means supports from within at its outer edge surface the fold common to the two filter surfaces held apart by means, while the other edge piece of the same spacer means is located and formed in a manner to provide between the inner edge surface of said other edge piece and the two folds situated adjacent thereto and defining the filter surfaces held apart by the spacer means, a gap which permits flow of the medium being filtered to and from said surfaces, and wherein said other edge piece is arranged to protrude beyond the two last mentioned folds to protect the same from physical damage.

2. A filter according to claim 1, wherein the distance in each spacing means between the outer edge surface of said one edge piece and the inner edge surface of said other edge piece slightly exceeds the extension of each filter surface in the longitudinal direction of the web of fibrous material.

3. A filter according to claim 1, wherein each spacing means is provided with two stiffening ribs, which extend opposite each other between said edge pieces and along the long edge of the folded web of fibrous material.

4. A filter according to claim 1, wherein each spacing means is a single integral unit.

5. A filter according to claim 1, wherein the said other edge piece of each spacing means has a shape which comprises means for allowing substantially laminar flow of the medium being filtered into and from the filter.

6. A filter according to claim 1, wherein at least one of the stiffening ribs is constructed so that it abuts the adjacent filter surfaces along a narrow edge surface, the width of which comprises only a portion of the largest width of the stiffening ribs in the direction across the plane of the fibrous material web.

7. A filter according to claim 6, wherein the stiffening rib presenting a narrow abutment edge surface comprises a member having a parallelogram-shaped cross-sectional area, the one diagonal of which extends between the adjacent filter surfaces while the other diagonal extends substantially parallel with said filter surfaces.

* * * * *